United States Patent Office 2,893,839
Patented July 7, 1959

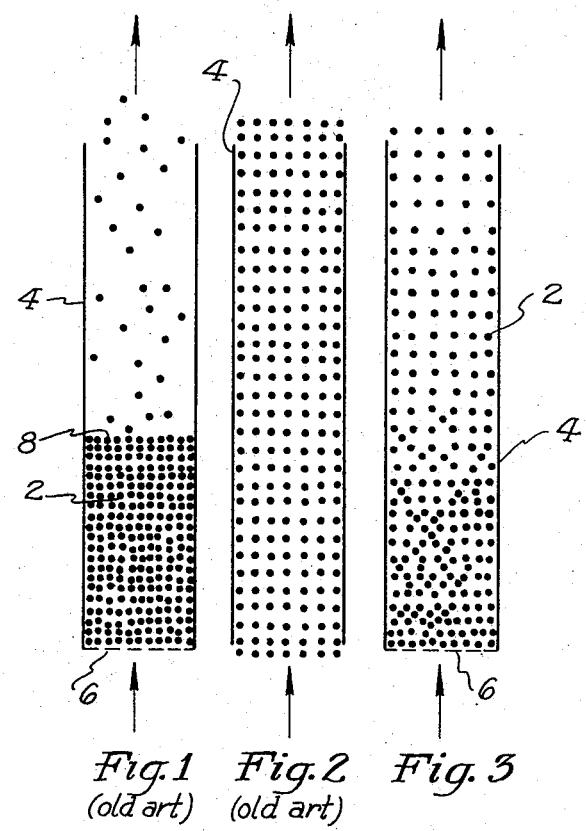
Fig.1 (old art)  Fig.2 (old art)  Fig.3

2,893,839

PROCESS FOR TREATING COMMINUTED SOLIDS WITH GASES

Franz Schytil, Frankfurt am Main, Germany, assignor to Metallgesellschaft Aktiengesellschaft Application March 5, 1957, Serial No. 644,172

2 Claims. (Cl. 23—177)

This invention is directed to the exothermic roasting of materials in a fluid bed and is a continuation-in-part of my application Serial No. 368,478, filed July 16, 1953, for "Process for Treating Comminuted Solids with Gases," now abandoned.

When an upwardly directed gas current is led through a charge of a granular solid body located in a shaft-shaped compartment, then the granular particles of said solid body begin to move once a given minimum velocity of gas is reached, and the solid granular bed commences to extend. With increasing velocity, this expansion likewise increases and, in the same way, the impulses of the individual particles become more powerful and the number of collisions increases. The suspension of solid granular bodies and gas in this state resembles a liquid bubbling as it boils, and it has a distinct surface. A particle aggregate brought into such a state has the property of offering extraordinarily good contact with the carrier gas and within itself, so that chemical reactions take place very rapidly and temperature differences within the fluid bed can exist only to a very slight extent. Such fluid beds are suitable, therefore, for carrying out catalytic and other reactions with which constant catalyst temperature or solid body temperature is required throughout the entire reaction compartment.

Also, with the so-called pneumatic conveyors or elevators, the action of a current of air or gas blown through a tube is utilized. Here, the air is sucked or blown through the granular material at such a high velocity that the so-called velocity of suspension of the particles is exceeded and the latter are carried along with the air current.

For the treatment of gases with solid catalysts, more particularly for the catalytic cracking of hydrocarbon vapors, a process exists which corresponds to an intermediate state between the two above-described states. In this case, the gas velocity employed is higher than would be admissible for maintaining the fluidized state; and simultaneously, the velocity at which the solid substance is fed is set above a critical value which is unusually high with respect to the two other processes.

Only by the simultaneous application of these two measures (increase of the gas velocity and of the rate at which the solid substance is fed) is a state achieved at which the particles of solid substance are wholly, or for the appreciably greater part, carried along by the gas current, although at a velocity which is retarded with respect to that of the gas current, and simultaneously there occurs in the reaction vessel a decrease in the concentration of the solid substance.

In contrast to the practically rectilineal particle velocity with pneumatic conveying, with this process, there takes place a movement of the particles in all directions, although with a resultant movement in an upward direction, whereas in the fluidized state the resultant of all particle movements is equal to zero in the center.

When considering the density of this suspension of solid substance and gas in the three states, it is found that in the fluid bed a relatively high and practically constant density prevails from below upwards, whereby, at the most, approximately 70 percent of the space occupied by the fluid bed can consist of interstices. At the boundary surface the density suddenly decreases to a low value. Similarly, with pneumatic conveying, there is a constant density over practically the entire conveyor column, it being possible for the volume of solid substance and interstices, respectively, to be altered as desired by the supply of material. The conditions in the intermediate state are entirely different. Here the density of the suspension decreases in an upward direction when the feed of solid substance is increased above the critical value, with simultaneous increase in the gas velocity above the value admissible for the fluidized state. The material is conveyed slowly through the compartment. It is necessary for fresh material to be supplied constantly. This supply is effected at the rate at which material is withdrawn as a result of the self-adjusting transportation. This state is, generally speaking, characterized in that in the lower part of the rising bed there is more than 70 percent by volume of the interstitial space, whereas at the outlet of the apparatus, the amount of hollow space may be 90 percent and more.

The objects of the invention are to apply the process with the upwardly decreasing particle concentration to the roasting of strongly exothermic ores.

Figure 1 shows diagrammatically the fluidized bed, Figure 2 shows the pneumatic lift, and Figure 3 shows the process with the upwardly decreasing particle concentration.

It has now been found that appreciable advantages are obtained by the application of the process of Figure 3 to reactions other than those suggested hitherto, as, for example, to strongly exothermically proceeding processes wherein the solid substance participates chemically, more particularly the roasting of sulphidic ores. Above all, with this process, an appreciable output increase of a given reactor, as against that possible when operating in accordance with the fluid bed principle, is possible. The difficulties encountered when carrying out endothermic processes, such as catalytic cracking, do not occur in this instance. On the other hand, there is the significant advantage in that at the point of gas inlet, first, the roasting air arriving in a cold condition exercises a cooling action, and despite the heat already being generated here, there is no danger that the particles will bake together. In the higher zones, the temperature increases are due to the reaction heat. However, here the particle density is less and thus the danger of a baking together is substantially removed. In accordance with the invention, therefore, it is possible to operate at far higher temperatures than in the fluid bed without the material sintering together. Due to the higher gas velocity, moreover, it is possible for a larger amount of material to be passed through an apparatus of the same dimensions in a given unit of time than is the case with the actual fluid bed process.

Here a mixture of solid bodies and gas which can be separated from one another by various known processes leaves the reaction chamber. In addition thereto, it is also possible for material to be withdrawn laterally from the rising bed.

It is particularly advantageous to return the portion of solid substance of the discharged suspension of solid substance, possibly after cooling, more particularly when the supply of solid substance necessary for maintaining the physical state of the rising whirling suspensions used in accordance with the invention is greater than corresponds to the stoichiometric ratio of the oxygen supply of the gas being passed through.

Should an intermediate cooling not be necessary, the reflux can be attained merely by providing at the upper end of the apparatus a reflux cyclone which returns the portion of solid substance through a standpipe penetrating the layers of higher density. It may also be advantageous to widen the shaft towards the top so that here on the outlet side a greater drop in density takes place.

The invention is explained in greater detail in the following examples:

Example I

A pyritic ore having 39 percent sulphur in the dry substance and 10 percent moisture, with a grain size of 90 percent below 5 mm. and 50 percent below 3.5 mm., was introduced through a compressed air injector at the rate of two tons per hour below the center of a reactor shaft, 4 m. high and having a cross-section of 1 sq. m. The bottom of the shaft was closed by a sieve plate, through which was fed 5,000 normal cub. m. of air per hour. The hourly output in two centrifugal separators arranged in series was 1.0 ton roasting residue containing 1.3 percent S. In addition, 0.37 ton of roasting residue containing 1.8 percent sulphur was withdrawn hourly through an outlet connection arranged above the sieve plate. The gas from roasting contained 10.0 percent by volume of $SO_2$, with a temperature of 1,000 degrees C.

Example II

If a dry flotation ore with particle sizes ranging between 30 and 100 microns is roasted in a furnace in accordance with the fluid bed process, with the grain sizes mentioned, a loading of roasting air of approximately 500 cub. m. per sq. m. is provided it does not exceed approximately two tons per sq. m. per hour. Only if this value is exceeded will the state used according to the invention be attained. By using roasted recycled ore particles as a part of the solids fed into the reactor, as the quantity of solids fed must be increased even more than what corresponds stoichiometrically to the increase in oxygen supplied by the increased gas velocity, this state is characterized by an interstitial volume above 70 percent in the lower part and 90 percent and more in the discharge, and the particle density and time of retention is sufficiently increased to permit ignition and roasting. Thus it is possible to maintain a much higher air velocity than in fluidized bed operations and still ensure roasting, so that the feed rate of fresh ore can be increased in stoichiometric relation to the increased air velocity by, for example, four to five times.

Having now described the means by which the objects of the invention are obtained, I claim:

1. A process for the exothermic roasting of comminuted sulphidic ores such as pyrite, comprising continuously introducing raw and roasted recycled ore particles into a stream of a gas reactive to said sulphidic ores having a velocity greater than permissible to form a fluid bed of said particles and feeding particles into said stream at a rate greater than that permissible for pneumatic conveyance, the feed rate of raw sulphidic ore particles being in stoichiometric balance with the reactive gas and the balance of solid feed being composed of recycled roasted ore particles, so that a suspension of solid particles in gas is formed in which the solids concentration decreases upwardly from the beginning of said gas stream through the reactive area to the top discharge point, and with the amount of recycled roasted particles forming a solids concentration greater than that corresponding to the stoichiometric ratio of raw unroasted particles to the gas stream.

2. A process as in claim 1, the rate of gas velocity and feeding of particles therein being maintained to produce a 30 percent solids content in the lower portion of the gas stream diminishing to 10 percent in the upper portion of said gas stream.

References Cited in the file of this patent

UNITED STATES PATENTS

| | | |
|---|---|---|
| 2,357,901 | Lewis et al. | Sept. 12, 1944 |
| 2,621,118 | Cyr et al. | Dec. 9, 1952 |
| 2,668,365 | Hogin | Feb. 9, 1954 |

FOREIGN PATENTS

| | | |
|---|---|---|
| 554,227 | Great Britain | June 25, 1943 |

UNITED STATES PATENT OFFICE

CERTIFICATE OF CORRECTION

Patent No. 2,893,839 July 7, 1959

Franz Schytil

It is hereby certified that error appears in the printed specification of the above numbered patent requiring correction and that the said Letters Patent should read as corrected below.

Column 3, line 32, after "is" insert -- permissible, per hour. In accordance with the stoichiometric conditions, in this case a feed velocity of 0.2 to 0.25 ton per sq. m. per hour is maintained, as the oxygen supplied by the air at this gas velocity just suffices to roast 0.2 to 0.25 ton per sq. m. per hour. However, in order to come within the process embodied in the invention, the gas velocity must be increased to at least 2,000 cub. m. per sq. m. per hour. At this gas velocity, a fluidized bed consisting of small particles of this type would be completely blown away, so that the time the ore particles would be retained within the reactor would not suffice for ignition and roasting. If the feed velocity of 0.2 to 0.25 ton per sq. m. per hour is maintained, a pneumatic conveying is obtained. This persists also when the feed velocity is increased, --.

Signed and sealed this 26th day of January 1960.

(SEAL)
Attest:
KARL H. AXLINE
Attesting Officer

ROBERT C. WATSON
Commissioner of Patent